United States Patent [19]
Vogel et al.

[11] 3,843,612

[45] Oct. 22, 1974

[54] MOLDABLE AND/OR THERMOFORMABLE ACRYLIC POLYMERS AND PROCESSES FOR THE PRODUCTION THEREOF

[75] Inventors: Martin Vogel, Jenkintown; Marvin J. Hurwitz, Elkins Park, both of Pa.

[73] Assignee: Rohm and Haas Company, Philadelphia, Pa.

[22] Filed: Dec. 23, 1971

[21] Appl. No.: 211,645

Related U.S. Application Data

[63] Continuation-in-part of Ser. No. 56,690, July 20, 1970, abandoned.

[52] U.S. Cl. ..... 260/78.5 R, 260/63 UY, 260/73 R, 260/79.7, 260/80.7, 260/80.72, 260/80.73, 260/80.8, 260/86.1 R, 260/88.1 PC, 264/331

[51] Int. Cl. ............................................ C08f 15/02

[58] Field of Search ....... 260/88.1 PC, 78.5 R, 80.8, 260/86.1 R, 86.7

[56] References Cited
UNITED STATES PATENTS 3,247,144  4/1966  Masters et al. .............. 260/88.1 PC
3,247,288  4/1966  Masters et al. .............. 260/88.1 PC

*Primary Examiner*—Harry Wong, Jr.
*Attorney, Agent, or Firm*—Michael B. Fein

[57] ABSTRACT

A process for the production of acrylic moldable and/or thermoformable polymers by the free radical polymerization of a mixture of monomers containing from 40 to 98 weight percent of lower alkyl methacrylate, cycloalkyl methacrylate, styrene, or substituted styrene or a mixture of such monomers, from 2 to 60 weight percent of an $\alpha,\beta$-unsaturated carboxylic acid having at most a single substituent other than hydrogen in the $\alpha$ or $\beta$ position, and a 3,4-epoxycyclohexylcarbinyl 3,4-epoxycyclohexanecarboxylate in an amount such that the ratio of epoxy groups to carboxyl groups is 0.1 to 1.2. The polymers thus produced have an even distribution of the cross-linking material, and are useful as moldable or thermoformable materials.

7 Claims, No Drawings

MOLDABLE AND/OR THERMOFORMABLE ACRYLIC POLYMERS AND PROCESSES FOR THE PRODUCTION THEREOF

This application is a continuation-in-part of copending application Ser. No. 56,690, filed July 20, 1970 now abandoned.

DESCRIPTION OF THE INVENTION

The present invention is directed to a method of producing evenly cross-linkable and cross-linked polymers, and the polymers themselves. In particular, the present invention is directed towards the production of polymers of $\alpha$, B-unsaturated carboxylic acid and another monomer wherein free radical polymerization of the monomers is effected in the presence of a certain type of diepoxide and simultaneous partial condensation of the diepoxide with the acid copolymer to cross-link it in the presence of both a free radical initiator and a catalyst for the condensation, resulting in a highly evenly or uniformly distributed epoxide content and/or evenly distributed content of residues of the reaction between epoxy and carboxy groups. The catalyst for the condensation may be introduced into the monomers/diepoxide mixture at the same time as the free radical initiator or later during the polymerization, but it should be introduced before the polymerization system reaches a viscous state so that it can be readily distributed uniformly through the mixture, thereby providing maximum uniformity of distribution of cross-links in the partially cross-linked moldable or thermoformable material and in the finally cured molded or heat-formed article.

Generally, the thermoset acrylic plastics of the prior art are of two general types; the major type being that in which an acrylic monomer, such as methyl methacrylate, is copolymerized with a cross-linking monomer, such as ethylene glycol dimethacrylate, and the other being that obtained by reacting a linear acrylic polymer containing reactive groups with a polyfunctional reactant having groups complementally reactive with the reactive groups of the polymer, such as that obtained by reacting an acid copolymer with a diepoxide as in U.S. Pat. No. 3,027,357. They provide only limited improvements over thermoplastic acrylic resins, e.g., poly(methyl methacrylate) or suffer from a lack of versatility: the majority of thermoset acrylic resins (that is, the first type) of the prior art must undergo most of their hardening, i.e., the final cross-linking, in the finally desired shape since only a very limited amount of reshaping is possible after the initial cure.

In the moldable and the thermoformable polymers of the second type of the prior art, significant drawbacks were encountered in view of the general lack of even distribution of the cross-linking material therein and in the finally cured products. Polymers produced by the prior art processes had problems such as differences in refractive index, and haze. Also, problems of irregular diffusion in articles formed by molding and then cross-linking a polymer/cross-linker mixture were extant. The polymers of the present invention, on the other hand, do not have these difficulties in view of the even distribution of the cross-links and still unreacted cross-linking material in the polymers of the present invention while in the still moldable and/or thermoformable condition and the consequent even distribution of the cross-links in the finally cured state.

Further, it has been discovered that the present thermosettable acrylic plastic compositions, when fully cured, provide significantly improved properties over thermoplastic polymers of methyl methacrylate. In particular, solvent resistance, hardness, and solvent craze resistance under stress, etc. are improved. Moreover, the compositions of the present invention have surprisingly good molding behavior since the initially formed moldable and/or thermoformable product of the polymerization of the present invention in partially cured or partially cross-linked condition may be a viscous liquid having a viscosity of at least about 10,000 poises at room temperature (25°C.) or it may be a solid. In either case, it is still thermoformable. When solid, the partially cured, that is, partially cross-linked polymeric composition of the invention may be in the form of granules or powder, or a sheet that can be remolded into simple or complicated shapes.

The starting liquid composition as well as the viscous partially polymerized and/or partially cross-linked composition of the present invention can be fully cured into the final shape desired in a single-stage or two-stage heating operation. Further, the curing may be stopped at any stage between the initial liquid state and that of the fully cured thermoset product to produce any desired consistency of material therebetween. For most purposes, the liquid polymerized and partially condensed compositions have a viscosity of at least 10,000 poises at about 25°C. These compositions, as well as the moldable and/or thermosettable solid compositions, of the present invention are more versatile, in that they are more readily converted into a wide variety of highly intricate and irregular forms, than the thermosetting acrylic materials of the prior art. The fully cured materials of the present invention have a high transparency, low color, and good weather-ability typical of the thermoplastic acrylics.

For the purposes of this invention, the following definitions given shall be adhered to. A thermoplastic is a polymeric material that is fully or largely soluble in a solvent and shows liquid flow under the application of heat and pressure. A thermoset is a polymeric material that is fully or largely insoluble in all solvents and does not show liquid flow under application of pressure and heat. A moldable composition is one that is at least temporarily thermoplastic and may contain various molding aids or materials as desired. A thermoformable composition is one which may be shaped or, if initially produced in a particular form, such as a sheet, may be reshaped at least once under the application of heat and force but is not necessarily thermoplastic. That is, the thermoformable composition would be one which is more highly cross-linked than a moldable composition, but may still be formed.

The thermoformable acrylic polymers of the present invention are made by the simultaneous (1) copolymerization of (a) about 40 to 98, preferably 90 to 98, weight % of one or more monomers selected from the group consisting of alkyl methacrylates, cycloalkyl methacrylates, styrene and alkyl-substituted sytrenes, such as vinyltoluene (o, m, and p), (b) about 2 to 60, preferably 2 to 10, weight % of one or more $\alpha$, $\beta$-monoethylenically unsaturated acids and (c) optionally up to 5% by weight of another copolymerizable ethylenically unsaturated monomer having a group of the formula

and (2) condensation of the acid copolymer with a diepoxide, effected at a temperature up to about 90°C., in a mixture of these monomers containing a free radical initiator, a basic catalyst for the condensation reaction, and a diepoxide of the formula I:

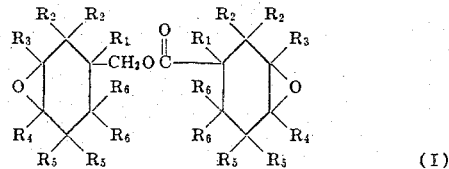

wherein $R_1$ represents a hydrogen atom, a halogen atom or a lower alkyl radical containing between one and four carbon atoms, $R_2$, $R_3$, $R_4$, $R_5$, and $R_6$ represent a hydrogen atom or a lower alkyl radical containing between one and four carbon atoms.

The amount of the diepoxide is selected to provide from 0.1 to 1.2, and preferably 0.5 to 0.9, epoxy groups per acid group in the acid (b), which preferred range results in solid products.

The preferred monomers of (a) above are the ($C_1$-$C_4$)-alkyl and the cycloalkyl methacrylates, especially methyl methacrylate, cyclohexyl methacrylate, and the methyl-, dimethyl, and trimethyl-cyclohexyl methacrylates.

The preferred acid monomers of (b) above are acrylic acid, methacrylic acid, and itaconic acid, and mixtures of two or more of these acids, though α-chloroacrylic acid, monomethyl itaconate, 4-pentenoic acid, methacryloxyacetic acid, and acryloxypropionic acid as well as many others within the scope of the broad definition of the acid may be used.

Besides at least one monomer (a) and at least one monomer (b) there may be present in the mixture to be polymerized, one or more other monomers (c) of monoethylenically unsaturated type and having a group of the formula

in an amount up to about 5% by weight of the total weight of monomers (a), (b), and (c). These additional monomer(s) even in the minor amount(s) used may impart or enhance a particular property, such as weathering durability, resistance to ultraviolet light, and so on. Examples of such monomers include vinyl chloride, vinylidene chloride, trichloroethylene, chlorotrifluoroethylene, vinylidene fluoride, and the like; vinyl esters, such as vinyl acetate, vinyl acetate, vinyl oleate, and the like; olefinically unsaturated nitriles, such as acrylonitrile, methacrylonitrile, and the like; aliphatic olefins, such as ethylene, propylene, butene, butadiene (which acts as a monoethylenically unsaturated monomer), isobutylene, piperylene, and the like; acrylic acid amides such as acrylamide, N,N-dimethylacrylamide, N,N-diethylacrylamide, and the like; and various other polymerizable, olefinic compounds, such as dibutyl maleate, vinyl cyclohexyl ether, methyl vinyl ketone, allylidene diacetate, acrolein, vinyl pyrrolidone, ethylthioethyl methacrylate, and ($C_1$-$C_4$)-alkyl acrylates, e.g. methyl, ethyl or butyl acrylate.

Examples of the diepoxides of Formula I that are particularly useful include:

3,4-epoxycylohexylmethyl 3,4-epoxycyclohexanecarboxylate;

3,4-epoxy-1-methylcyclohexylmethyl 3,4-epoxy-1-methylcyclohexanecarboxylate;

3,4-epoxy-2-ethylcyclohexylmethyl 3,4-epoxy-2-ethyl-cyclohexanecarboxylate;

3,4-epoxy-6-methylcyclohexylmethyl 3,4-epoxy-6-methylcyclohexanecarboxylate;

3,4-epoxy-1-chlorocyclohexylmethyl 3,4-epoxy-1-chlorocyclohexanecarboxylate;

3,4-epoxy-1-bromocyclohexylmethyl 3,4-epoxy-1-bromo-cyclohexanecarboxylate;

4,5-epoxy-1-chloro-2-methylcyclohexylmethyl 4,5-epoxy-1-chloro-2-methylcyclohexanecarboxylate, and the like.

In the naming of the diepoxides of Formula I, the $-CH_2$ portion of the linkage $-CH_2OC-$ may be referred to as "methyl" as in the naming above or as "carbinyl."

The free radical initiators utilized in the process of the present invention are those usually present and in the amounts such as are utilized in the art of bulk polymerization. Generally, however, the initiators are present in amounts of from about 0.01 to 1.0, and preferably from about 0.05 to 0.4, weight percent based on the mixture of monomers.

The polymerization reaction can be catalyzed by the thermal or redox type initiator systems. Examples of thermal initiators include organic peroxides, such as benzoyl peroxide, substituted benzoyl peroxide, acetyl peroxides, lauroyl peroxides, t-butyl hydroperoxide, di-t-butyl hydroperoxide; peresters, such as t-butyl peroxypivalate; azo-type initiators, such as azobisisobutyronitrile; persulfates such as sodium, potassium, or ammonium persulfates; and peroxyphosphates, such as sodium, potassium or ammonium peroxyphosphate. Redox systems may include, for example, a combination of hydroperoxide, such as hydrogen peroxide, t-butyl hydroperoxide, cumene hydroperoxide, diisopropylbenzene hydroperoxide, and the like, with a reducing agent, such as sodium, potassium, or ammonium bisulfite, metabisulfite or hydrosulfite, sulfur dioxide, hydrazine, ferrous salts, isoascorbic acid, sodium formaldehyde sulfoxalate, and the like. Chain transfer agents, including mercaptans, polymercaptans, and polyhalogen compounds may be present in the polymerization mixture in the conventional amounts such as from about 0.1 to 2% or more by weight, based on the total weight of monomers.

The catalyst for the acid-epoxide condensation that may be added to the monomer/diepoxide composition when the initiator is added or during the early stages of polymerization before the mixture gets viscous includes both organic and inorganic bases, such as amines, including ditertiary amines, e.g., dimethylaminophenol, benzyldimethylamine, and dimethylaminoethyl phenol, alkali metal or alkaline earth metal hydroxides, e.g., sodium hydroxide and calcium hydroxide, quaternary ammonium hydroxides, e.g., benzyltrimethyl ammonium hydroxide; salts, which in the presence of epoxy groups generate basic substances, e.g., potassium acetate, sodium methacrylate, quaternary ammonium salts, such as benzyltrimethylammonium acetate, nitrate, or chloride, sodium dodecylbenzene sulfonate and alkyl, aryl, or alkylaryl phosphonium iodides, e.g., tetraethylphosphonium iodide. The catalysts are employed in catalytic quantities, say from 0.01 percent to 5 percent based on the total compositions.

The mixture of monomers, initiator, catalyst and diepoxide may also contain auxiliary materials that are or may be influential on the characteristics of the polymerized composition obtained. Such materials may be mold lubricants, such as fatty acid soaps; dyes, pigments, and fillers including both pulverized minerals and organic or inorganic fibrous materials; ultraviolet or infrared light absorbers, and impact modifiers of addition or condensation polymeric type. The auxiliary materials are used in the conventional amounts for the purposes intended. The polymerization may be effected over a period of about 1 to 24 hours or more, such as up to 40 to 50 hours, preferably at about 20° to 80°C. and the reaction is usually effected at atmospheric pressure, although pressure as high as about 200 psi and as low as about 30 mm Hg may be utilized. It should be noted that the temperature of the polymerization of the present invention will determine the degree of carboxy/epoxy reaction during the original polymerization and thus will, to some extent, determine the consistency of the material produced in the reaction. Other factors tending to produce viscous liquids rather than solids are use of more than enough diepoxide to provide one epoxy group per carboxy group, and using a very low amount of initiator, e.g. 0.001 percent on total monomers or taking other steps so that copolymerization stops substantially short of complete conversion.

During the polymerization of the monomers in the presence of a catalytic amount of a catalyst for the acid-epoxide condensation, there is also some reaction between the diepoxide and the acid monomer and/or with acid groups in the copolymer immediately upon its formation. By virtue of the thorough mixing of the diepoxide and the basic catalyst with the monomers immediately before the polymerization or during the polymerization, the cross-linking material is thoroughly distributed in an even and uniform fashion throughout the polymerizing mixture. In effect, the moldable or thermoformable copolymer composition obtained may comprise various components including an acid copolymer wherein the carboxyl groups are unreacted with the diepoxide, an acid copolymer in which some of the acid groups are reacted with with one of the epoxy groups of the diepoxide to that units of copolymer contain epoxy groups available for subsequent reaction with carboxyl groups of the same or another acid-containing copolymer component, and a component in which copolymer molecules are cross-linked by virtue of the reaction of acid groups thereof with the epoxy groups on the diepoxide. It is also believed that a substantial proportion of the diepoxide remains unreacted at the conclusion of the polymerization when the initial mixture contains the relative amounts of diepoxide and acid monomer within the range defined hereinabove.

The initial composition containing the monomers, the initiator, the catalyst for the acid-epoxide condensation, and the diepoxide may be cast and caused to polymerize and then cured by heating to elevated temperatures of abut 120°C. to 200°C., preferably 150° to 180°C. or higher, for a time of at least about 15 seconds up to 20 hours, in the form determined by the construction or shape of the device in which the casting is performed. The proportion of diepoxide relative to the number of acid groups available in the polymerizing composition preferably is so selected that curing in the elevated temperature range just specified results in substantially complete reaction of the epoxy groups to form an insoluble, essentially fully cured polymeric product containing no or an insignificant amount of oxirane oxygen.

Alternatively, and in the preferred manner of carrying out the invention, the mixture of monomers, initiator, basic catalyst and diepoxide with or without other materials may be subjected to polymerization conditions so as to produce a moldable or thermoformable viscous or solid material which may be formed into granules, a sheet or extruded pellets. The polymer thus obtained still contains residual unreacted epoxy groups as a result of the incomplete reaction of the diepoxide with the acid polymer under the temperature conditions (20° to 80°C.) of polymerization. As the polymer becomes more viscous, the epoxy-carboxy reaction becomes slower and slower until a solid stage is reached when the reaction in that range of temperature virtually ceases completely. In general, the most preferred amount of diepoxide contained in the initial polymerization mixture is such as to provide from 0.5 to 0.9 epoxy groups per acid group of the acid monomer in the initial polymerizable mixture from which the copolymer is to be produced and the extent of reaction between the epoxy groups and the carboxylic groups is such as to provide a moldable or a thermoformable composition, whether it is in the form of granules, a sheet, extruded pellets, or otherwise, which contains an oxirane oxygen content of 0.2 to 7% by weight and preferably 0.4 to 5% by weight. In general, the compositions having an oxirane content of about 5–7% by weight are moldable, those having 0.2 to 1% by weight are thermoformable whereas those containing 1 to 5% by weight of oxirane oxygen are moldable and thermoformable, as defined herein. The preferred relation of epoxy to acid groups avoids excessive tendency to discolor on subsequent curing and/or on ageing.

A preferred group of thermoformable copolymers are those obtained from a mixture of free-radical initiator, basic catalyst, a diepoxide of Formula I, 2 to 10 parts by weight of methacrylic acid, and 98 to 90 parts by weight respectively of methyl methacrylate, the amount of diepoxide being such as to provide 0.5 – 0.9 epoxy groups per carboxylic acid group, the extent of carboxyl/epoxy reaction during polymerization being such as to provide in the thermoformable polymer an oxirane content of about 0.3 to about 1.5% by weight, based on the weight of the polymer.

When the polymerization process is effected in the presence of chain transfer agents such as mercaptans, and at limited ambient temperatures, preferably about 20° to 50°C., a solid but still thermoplastic product can be obtained which contains very little residual olefinically unsaturated material. This product is particularly useful for molding powders, in view of the substantially even distribution of basic catalyst and (1) any residual diepoxide and (2) of epoxy-carboxy reacted components in the polymerized product. Molding powders can be prepared from such mixtures by granulating the solidified polymer produced in this manner. Some residual olefinically unsaturated material is advantageous in the molding powders since it lowers the melt viscosity, but the amount of residual unsaturation must be controlled in view of the fact that undesirable amounts of shrinkage of the product during molding will result if the level of unsaturation is too high. The powders may be molded by compression, or transfer, or injection molding techniques using temperatures of about 120° to 220°C. or more, preferably 150° to 180°C., and the customary pressures of 1,000 to 5,000 psi, in compression, and 10,000 to 20,000 psi in transfer or injection molding. The molding cycle may be from about 15 seconds to 15 minutes or more per unit depending on the extent of cure of the polymer in the molding powder, a cycle of about a minute to 2 minutes being quite practical in most instances. When the polymers of the present invention are prepared in sheet form by a conventional process, they may be stretched at elevated temperatures to give improved properties, or they may be formed into more complicated shapes by application of heat and pressure, for example, in equipment for the vacuum-forming of products therefrom. This final shaping may be effected at temperatures of about 140° to 220°C. or higher, preferably about 150°C. to 180°C. and a pressure of 5 to 20 psi or, in the case of a vacuum-forming process, from 20 to 30 mm Hg, the time being comparable to the time of the molding cycle just mentioned.

The solid partially cured polymers, are formable and have even distribution therein of the epoxide residues (reacted and/or unreacted) and such distribution persists also in the fully cured product. In their fully cured state, they have a glass transition temperature of at least 75°C. Such even distribution which persists even after fully curing the product is one characteristic of the present invention which was not attained by the prior art and represents a significant improvement thereover. For example, in U.S. Pats. No. 3,247,144 and 3,247,288, the monomers including the acid monomer are dissolved in a diepoxide and copolymerized under conditions (no basic catalyst and temperature not above 155°C.) which precluded reaction of the epoxide with the acid monomer or copolymer. According to U.S. Pat. No. 3,247,144 col. 6, lines 62 to 70, when no basic catalyst is present, heating at 170° to 200°C. for a period of 3 to 12 hours is needed for the curing of the acid copolymer with the diepoxide. These patents lack any teaching of the production of a moldable or thermoformable extremely viscous or solid composition of the type which the present invention contemplates, namely wherein uniform distribution of cross-links in the finally cured product is attained.

Another characteristic of the invention is the fact that it is possible to select the monomers and diepoxide and their relative proportions in such a way that moldable and/or thermoformable polymers can be obtained in granular, pellet or sheet form which have such stability at normal room temperatures or under ordinary refrigeration conditions that they can be stored for periods of three to four months at room temperature or under practical refrigeration conditions while still retaining the capability of being readily molded or otherwise formed or reformed.

In all of the above forms, the polymers of the present invention, after being formed into their shape, may be further cross-linked, i.e. cured by heating to temperatures of 140° to 200°C. or higher, preferably from about 150° to 180°C. for periods of about ¼ hour to 24 hours. Also, the presence of catalytic amounts of organic bases, such as ditertiary amines, or inorganic bases, such as sodium hydroxide, in the initial polymerizable compositions develops superior thermoset properties by epoxy-carboxy reaction in shorter times. Flat sheets may be hung vertically in an oven or laid horizontally on felt-covered shelves in an oven in order to obtain full cure. More complicated parts can be cured directly in the mold in which they are formed if the mold is hot, or the part may be placed in an oven and heated slowly to elevated temperatures in order to avoid any serious distortion of the part. The molding powders of the present invention are particularly useful for molding lenses, refractors, and other optical parts, or for molding decorative inserts where particularly high temperature service may be encountered. The flat sheets can be used for blow molding. Such sheets are useful in military aircraft glazing. Also the flat sheets may be thermoformed into Fresnel lenses, refractors, and diffusers for lighting fixtures. The novel thermoset acrylic plastic compositions of the present invention, when fully cured, provide durable, stable products having marked property improvements over thermoplastic poly(methyl methacrylate) in hardness, solvent resistance, solvent craze resistance under stress, resistance to thermal expansion and contraction, distortion temperature under load, rigidity, flame resistance, abrasion resistance, heat resistance, and creep resistance.

The polymers of the present invention are far superior to those obtained in accordance with the aforementioned patents, apparently as a result of the even distribution of the cross-linking material in the polymeric product which is of a relatively high glass transition temperature. In particular, the glass temperature of the polymers of the present invention is usually at least about 75°C. Further, the even distribution of the cross-linking agent in the polymeric product results in a material having outstanding transparency and optical qualities, especially in respect to freedom from optical distortion, when properly shaped unpigmented products made in accordance with the present invention without the use of volatile solvents and the difficulties associated therewith, especially in getting rid of solvent residues, are utilized for making lenses or other materials which are to be transparent or translucent.

The following examples are included as representative of the embodiments of the present invention. The parts and percentages are by weight and the temperatures are in Centigrade unless otherwise noted.

EXAMPLE 1

A mixture of 49 parts of methyl methacrylate, 21 parts of methacrylic acid, and 29.4 parts of 3,4-epoxycyclohexylcarbinyl 3,4-epoxycyclohexanecarboxylate, 0.1 part of 2(2'-hydroxy-5o'-methylphenyl)benzotriazole (an ultraviolet absorber), 0.4 part of sodium hydroxide, 0.20 part of a 75% solution of t-butyl peroxypivalate in mineral spirits, and 2 parts of n-dodecyl mercaptan is stirred until the solids are dissolved. The solution is degassed at 30 mm. of mercury pressure, and sealed in a glass tube under a nitrogen atmosphere. The contents of the tube are hard after 40 hours. The clear, colorless product is removed from the tube and granulated, and is soluble in methanol, softens at 50° – 60°C. and becomes fluid at 100° – 110°C. The polymeric powder is compression-molded into a flat sheet in a metal mold at 180°C. and about 600 psi for 15 minutes and results in a colorless transparent sheet that is unaffected by methanol, methylene chloride, toluene or hot water.

EXAMPLE 2

A mixture of the materials of Example 1, except that p-methoxybenzylidenemalonic acid dimethyl ester is substituted for the benzotriazole, is stirred until homogenous. The mixture is then placed in a cell formed by two brass plates and a ⅛ inch flexible rod spacer inserted between the plates and around the edges thereof. The inside surfaces of the brass plates are coated with a release agent, and the air-free cell formed thereby is about 120 mils thick. The cell is placed in a forced air oven at about 40°C. for 17 hours and produces a hard polymeric sheet. A piece cut from the sheet is heated in an oven for about 3 minutes at about 150°C. and then blown into a dome shape with air pressure. This sheet is, thus, a thermoformable blow-moldable sheet.

EXAMPLE 3

A sheet similar to the one described in Example 2 is cured in a flat condition for 16 hours at 150°C. and results in a thermoset acrylic sheet having the physical characteristics shown in Table I following wherein its properties are compared with the properties of a conventional thermoplastic poly(methyl methacrylate) sheet:

TABLE I

| Property | Thermoset Acrylic Sheet | Poly(Methyl) Methacrylate Sheet |
| --- | --- | --- |
| Specific Gravity | 1.22 | 1.19 |
| % Light Transmittance | 91 | 92 |
| % Haze | 2 | 1 |
| Tensile Strength, psi | 9,900 | 10,500 |
| Tensile Modulus of Elasticity (psi) | 613,000 | 450,000 |
| Taber Abrasion Resistance[1] | 18.9 | 52.7 |
| DTUL°C.,[2] | 141 | 96 |
| Chemical Resistance[3] | | |
| Acetone | 3.9, slight attack | dissolves |
| Toluene | 0.1, no change | dissolves |
| Water | 1.7, no change | 0.4, no change |
| 10% Hydrochloric Acid | 1.3, no change | 0.3, no change |
| 1% Sodium hydroxide | 2.7, no change | 0.4, no change |
| Commercial Wax | 1.5, no change | attacked |

[1] Taber Abrasion Resistance is done utilizing a revolving 1,000 gram load and reading the percentage of haze after 100 revolutions.
[2] DTUL is the heat distortion temperature under load in degrees Centigrade, where the load is 264 psi.
[3] Chemical resistance is the percent of weight gain, and appearance of the sample after total immersion in the materials for 7 days at 77°C.

EXAMPLE 4

A compression-molded sheet obtained as in Example 1 is placed near a 400 watt mercury vapor lamp at an ambient temperature of around 150°C. along with a poly(methyl methacrylate) sheet as a control. After one week, the poly (methyl methacrylate) sheet is badly distorted while the thermoset acrylic sheet retains its original dimensions.

EXAMPLE 5 a. A thin sheet casting is made according to the present invention as follows:

A mixture of methyl methacrylate (47 parts), methacrylic acid (20 parts), 3,4-epoxycyclohexylcarbinyl 3,4-epoxycyclohexanecarboxylate (33 parts), mercaptoethanol (0.67 part) and sodium hydroxide (0.33 part) is stirred until homogeneous. One-half part of a 75% solution of t-butyl peroxypivalate in mineral spirits is added with agitation to thoroughly distribute it in the mix and the mix is placed in a thin, air-tight cell. The mixture is hardened in 17 hours at 45°C. The thin transparent sheet is removed from the cell and given a final cure at 150°C. for 16 hours.

b. For comparative purposes, an acid-containing emulsion copolymer is made as follows:

In a stainless steel reaction vessel are placed 236 parts of deionized water, 1.0 part of sodium lauryl sulfate, and 0.5 part of potassium persulfate. The resulting solution is stirred mechanically and heated to 80°C. with a water bath. A mixture of 70 parts of methyl methacrylate, 30 parts of methacrylic acid and 1.0 part of mercaptoethanol is added over a two-hour period while the temperature of the aqueous emulsion is maintained at 80°–86°C. After the addition is complete, the emulsion is stirred at 70°–85°C. for 1.5 hours. The solids content is 29.3%. To the polymer emulsion is added 0.5 part of sodium hydroxide (as a 1% aqueous solution) per 100 parts of solids. The partially neutralized emulsion is spray dried and the isolated polymer is redried at 100°–110°C. in a vacuum oven to remove residual volatiles. Then the acid copolymer is molded or cast with the same diepoxide to form a cross-linked or cured film as follows:

1. The dry copolymer (100 parts) and 3,4-epoxycyclohexylcarbinyl 3,4-epoxycyclohexanecarboxylate (49 parts) are mixed thoroughly with a mechanical mixer and compression-molded into a thick, transparent film at 180°C. The film is given further cure at 150°C. for 16 hours.

2. The partially neutralized, dried methyl methacrylate/methacrylic acid copolymer of part (b) (67 parts) is dissolved in 500 parts of methanol and then 33 parts of 3,4-epoxycyclohexylcarbinyl 3,4-epoxycyclohexanecarboxylate is added. The solution is spread on an inert surface, and the methanol is removed in a vacuum oven at 85°C.; foaming occurs during the evaporation. The rigid, transparent film is given a final cure at 150°C. for 16 hours.

c) The two thermoset films of parts (b) (1) and (b) (2) are compared to the thermoset film of part (a)

hereof; all three films have essentially the same overall composition in terms of methyl methacrylate, methacrylic acid, 3,4-epoxycyclohexylcarbinyl 3,4-epoxycyclohexanecarboxylate, mercaptoethanol, and sodium hydroxide.

Under the optical microscope, the thermoset materials of parts (b) (2) and (a) appear completely homogeneous. However, the thermoset material of part (b) (1) appears as a collection of circular regions 10–30 microns in diameter; this heterogeneity can be seen with the unaided eye as a grainy "orange peel" distortion.

Samples of each of the three thermoset films are extracted overnight in a Soxhlet apparatus with methanol and then overnight with methylene chloride; the total soluble material in each sample is determined by evaporation of the solvent from the two extracts and the results are shown in Table II herein. From the weights of the dry, unextractable plastic, the density of the plastic (1.2 g/cc), the weight of the plastic swollen with methylene chloride, and the density of methylene chloride, swelling ratios (volume of swollen polymer/volume of dry unextractable polymer)) are calculated and are shown in Table II; the thermoset plastic of this invention (part a hereof) is seen to have the smallest swelling ratio, i.e., the greatest resistance to solvent.

To show the distribution of the crosslinks in the three thermoset polymers, the following experiment is performed. A test solution is made from known amounts of three different alkylphenoxypolyethoxyethanols of differing molecular weights and molecular sizes in a known amount of methylene chloride. Gel permeation chromatography shows three distinct peaks for the three different alkylphenoxypolyethoxyethanols, and the retention volumes corresponded to $\bar{r}$ (root mean square radius) of 14, 19, and 30 A as determined by calibration of the chromatography column. Weighed samples of each of the three extracted thermoset polymers still swollen with methylene chloride are allowed to equilibrate with known amounts of the test solution for three days. Gel permeation chromatography of the methylene chloride solution after equilibration with the thermoset polymers shows decreases in the heights of some of the peaks from which the amounts of each of the three alkylphenoxypolyethoxyethanols that had diffused into the swollen polymer could be calculated. The results are presented in Table II as the percentage of the volume of each plastic available to methylene chloride that is not available to the alkylphenoxypolyethoxyethanols. The conventional interpretation of this data is that for the swollen thermoset polymer film of part (b) (2), 100% of the "pores" in the polymer available to methylene chloride are smaller than 30 A ($\bar{r}$), 97% are smaller than 19 A and 56% are smaller than 14 A, etc. The thermoset polymer of this invention has an extremely narrow distribution of pore sizes: 83% of the pores are between 14 and 19 A in apparent size; i.e., the spacing of the crosslinks is very uniform. The thermoset polymer films of parts (b) (1) and (b) (2) have much broader distributions of pore sizes with about half of the pores being smaller than 14 A; thus these polymer films have regions where the crosslinks are both more closely spaced and less closely spaced (but mostly the former) than the improved polymers of this invention.

TABLE II

| | Thermoset Plastic Film | | |
|---|---|---|---|
| | 5a | 5b) 1) | 5b) 2) |
| Extractables, weight percent | 1.7 | 2.4 | 1.1 |
| Swelling ratio, methylene chloride | 1.4 | 1.6 | 1.8 |
| Percent alkylphenoxypolyethoxyethanol excluded; | | | |
| $\bar{r} = 14$ A | 17 | 50 | 56 |
| $\bar{r} = 19$ A | 100 | 87 | 97 |
| $\bar{r} = 30$ A | 100 | 100 | 100 |

EXAMPLE 6

The procedure of Example 1 is repeated with each of the following mixtures:

a. 40 parts methyl methacrylate, 30 parts styrene, and 30 parts acrylic acid, with 50 parts 3,4-epoxy-1-methyl cyclohexylcarbinyl 3,4-epoxy-1-methylcyclohexanecarboxylate, b. 75 parts styrene, 1 part ethylthioethyl methacrylate, and 24 parts itaconic acid, with 40 parts of 3,4-epoxy-6-methylcyclohexylcarbinyl 3,4-epoxy-6-methylcyclohexanecarboxylate, c. 55% methyl methacrylate, 5% acrylonitrile, 25 parts vinyltoluene, 10 parts acrylic acid, and 5 parts methacryloxypropionic acid, with 20 parts of 3,4-epoxy-2-ethylcyclohexylcarbinyl 3,4-epoxy-2-ethylcyclohexanecarboxylate, d. 20 parts ethyl methacrylate, 70 parts styrene, 2 parts vinyl acetate, and 8 parts methacrylic acid, with 10 parts of 3,4-epoxy-1-chloro-2-methylcyclohexylcarbinyl 3,4-epoxy-1-chloro-2-methylcyclohexanecarboxylate, e. 65 parts of methyl methacrylate, 20 parts butyl methacrylate, 5 parts methyl acrylate, and 10 parts methacrylic acid, with 15 parts 3,4-epoxy-1,6-dimethylcyclohexylcarbinyl 3,4-epoxy-1,6-dimethylcyclohexylcarboxylate, and f. 55 parts of cyclohexyl methacrylate, 30 parts of styrene, and 15 parts of methacrylic acid, with 15 parts of 3,4-epoxycyclohexylcarbinyl 3,4-epoxycyclohexanecarboxylic acid.

Each of the solid polymers in the moldable and/or thermoformable stage as obtained upon granulation after removal from the tube in which the polymerization and partial epoxycarboxylic reaction occurs is stable for several weeks to several months at normal room temperature and is still moldable or thermoformable after such storage.

EXAMPLE 7

A mixture of 88.6 parts of methyl methacrylate, 4.2 parts of methacrylic acid, 6.8 parts of 3,4-epoxycyclohexylcarbinyl 3,4 epoxycyclohexanecarboxylate, 0.1 part of 2 (2'-hydroxy-5'-methylphenyl) benzotriazole, 0.6 parts of sodium methacrylate, 1.3 parts of n-dodecyl mercaptan, 0.12 part of a 75% solution of t-butyl peroxypivalate in mineral spirits and 0.04 part of acetyl peroxide is stirred until the solids are dissolved. The solution is degassed under vacuum and sealed in a glass tube under a nitrogen atmosphere. The contents of the tube are hard after 20 hours at 50° and are heated at 80° for an additional hour. The clear colorless product is removed from the tube and granulated. It is found to contain 2% residual methyl methacrylate. A sample of product is dissolved in tetrahydrofuran and titrated with alcoholic potassium hydroxide. Only 82% of the original methacrylic acid is still titratable indicating that 18% has reacted with epoxide. Granules of the product are compression-molded into a clear colorless slab at 200° for 5 minutes. The slab is removed from the mold and heated at 200° for 24 hours in an oven. The slab, after removal from the oven is essentially unchanged in shape or dimensions.

EXAMPLE 8

The procedure of Example 7 is repeated but with 91.3 parts of methyl methacrylate, 2.4 parts of methacrylic acid, 3.9 parts of 3,4-epoxycyclohexylcarbinyl 3,4-epoxycyclohexanecarboxylate and 0.4 part of sodium methacrylate. Again, a compression-molded slab retained its shape after 24 hours at 200°.

What is claimed is:

1. A process for producing a formed article which comprises
   first reacting, at a temperature of about 20° to 80°C., a mixture of
   a. a monomeric material containing
      1. 40 to 98 weight percent of a ($C_1$—$C_4$) alkyl methacrylate, cyclohexyl methacrylate, styrene, vinyltoluene or a mixture thereof,
      2. 2 to 60 weight percent of one or more $\alpha,\beta$-monoethylenically unsaturated carboxylic acid, and
      3. optionally up to 5 weight percent of another monoethylenically unsaturated monomer having a group of the formula

b. a diepoxide of the formula

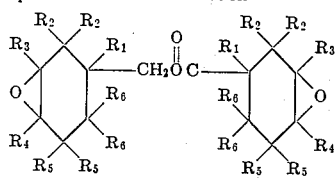

wherein $R_1$ represents a hydrogen atom, a halogen atom or a lower alkyl radical containing between 1 and 4 carbon atoms, $R_2$, $R_3$, $R_4$, $R_5$, and $R_6$ represent a hydrogen atom or a lower alkyl radical containing between a 1 and 4 carbon atoms, in an amount to provide about 0.1 to 1.2 epoxy groups per carboxylic acid group in (a) (2) above,
   c. a free radical initiator, and
   d. a catalyst for the acid-epoxide condensation to effect polymerization of the monomers and condensation of acid copolymer and diepoxide (b), so as to form a moldable and/or thermoformable viscous or solid polymeric product having a viscosity of from about 10,000 poises to solid at normal room temperature, thereafter heating to a temperature of at least 140°C. and prolonging the heating of the resulting formed article until it is fully cured.

2. The process of claim 1 wherein the acid monomer is selected from the group consisting of methacrylic acid, acrylic acid, and itaconic acid.

3. The process of claim 1 wherein the acid monomer is methacrylic acid and monomer (a) (1) is methyl methacrylate.

4. A process according to claim 1 in which the amount of (b) is such as to provide about 0.5 to 0.9 epoxy groups per carboxylic acid group in (a) (2) of claim 1.

5. A process according to claim 1 which is effected to introduce into the product an oxirane oxygen content of 0.2 to 7% by weight derived from the oxirane groups of (b).

6. A process according to claim 1 which is effected to introduce into the product an oxirane oxygen content of about 0.4 to 7% by weight.

7. The process of claim 1 further including molding or shaping said viscous to solid polymeric products produced by the first step.

* * * * *